United States Patent Office
3,493,581
Patented Feb. 3, 1970

3,493,581
IMIDAZOLIUM SALTS
Ernst Heinrich Pommer and Herbert Stummeyer, Limbergerhof, Pfalz, Anna Steimmig, Ludwigshafen, Rhine, and Hermann Spaenig, Limburgerhof, Pfalz, Germany, assignors to Badische Anilin- & Soda-Fabrik Aktiengesellschaft, Ludwigshafen (Rhine), Rhineland-Palatinate, Germany
No Drawing. Continuation-in-part of application Ser. No. 524,461, Feb. 2, 1966. This application May 9, 1968, Ser. No. 728,071
Int. Cl. C07d 49/36; A01n 9/22
U.S. Cl. 260—309
8 Claims

ABSTRACT OF THE DISCLOSURE

Imidazolium salts having the following formula:

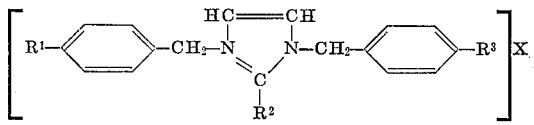

in which $R^1$ and $R^3$ are lower alkyl, $R^2$ is a member selected from the group consisting of hydrogen and lower alkyl, and X is an acid radical. The imidazolium salts can be used to control algae, bacteria, and fungi.

---

This application is a continuation-in-part of application Ser. No. 524,461, filed Feb. 2, 1966 (now abandoned).

The present invention relates to new benzylimidazoles. More particularly it relates to benzylimidazoles which are suitable for controlling algae, bacteria and fungi.

It is an object of the invention to provide new benzylimidazoles having valuable properties. Another object of the invention is to provide a process for controlling algae, bacteria and fungi with small amounts of active substance.

We have found that substituted benzylimidazoles having the formula

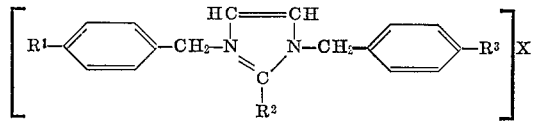

in which $R^1$ and $R^3$ are lower alkyl, $R^2$ is a member selected from the group consisting of hydrogen and lower alkyl, and X is an acid radical, have a very good activity against algae, bacteria and fungi.

The active compounds may be obtained by methods known per se by allowing substituted benzylimidazoles to act on alkylbenzyl compounds at room temperature or while heating, particularly at temperatures of from 50° to 100° C., in the presence or absence of a solvent, for example acetonitrile.

Acid radicals include radicals of any organic or inorganic acids, particularly the radicals of halogen hydracids, for example hydrochloric acid, hydrobromic acid, hydriodic acid, sulfuric acid, p-toluenesulfonic acid, alkylsulfonic acids (lower alkyl), methylsulfuric acid ($CH_3OSO_3H$), ethylsulfuric acid ($C_2H_5OSO_3H$). Examples of specific active substances are those having the general formula

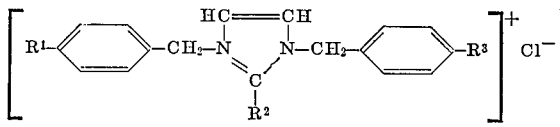

in which $R^1$, $R^2$ and $R^3$ have the meanings given in the following list of active substances:

| No. | $R^1$ | $R^2$ | $R^3$ | Melting point, ° C. |
|---|---|---|---|---|
| 1 | Isopropyl | Hydrogen | Isopropyl | 180 |
| 2 | do | Methyl | do | 241 |
| 3 | do | Isopropyl | do | ¹ 153 |
| 4 | do | Hydrogen | Isobutyl | 161 |
| 5 | Isobutyl | do | do | 178 |
| 6 | n-Butyl | do | n-Butyl | 125 |

¹ Hygroscopic.

The agents according to this invention may be obtained by mixing the active substances with conventional diluents or carrier materials, for example water, organic liquids, dispersing agents, wetting agents, solid inert materials or mixtures of these substances. It is also possible to incorporate other active substances, for example algicides, fungicides, bactericides, acaricides, ovicides or insecticides.

The agents according to this invention are applied in the conventional ways. For example, the agents may be used dissolved or dispersed in solvents or dispersing agents. They are suitable for protecting water against the incidence of algae. They may also be used in a similar way for preventing the development and for controlling slime-forming microorganisms in cooling towers and in the paper industry.

The agents may also be used to prevent microorganisms attacking, for example seeds, leather, paints, packaging materials or plastic dispersions.

The following examples illustrate the good activity of the agents according to this invention.

EXAMPLE 1

Table 1 gives the destruction values in respect of cultures of unicellular green algae comprising Scenedesmus spec., Chlorella spec. and Ankistrodesmus spec. in nutrient solutions. The tests are carried out in 10 liter glass cases. The active substances are not added until the nutrient solution has assumed a deep green color owing to the development of algae. After the active substance has acted for seven days, samples are taken from the test vessels and transferred to fresh nutrient solution without adding active substance. Four days later, the extent to which the algae had been destroyed could be judged. The following substance is used as a comparison agent:

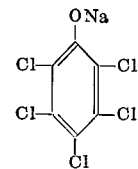

TABLE 1

| Active substance used | Amount of active substance in the nutrient solution in p.p.m. on the nutrient solution | | |
|---|---|---|---|
| | 15 | 10 | 5 |
| 1 | 0 | 0 | 1 |
| 2 | 0 | 0 | 1 |
| 3 | 0 | 0 | 2 |
| 4 | 0 | 0 | 1 |
| 5 | 0 | 0 | 2 |
| 6 | 0 | 0 | 0 |
| Comparison agent | 2 | 5 | 5 |
| Control (untreated) | | 5 | |

0=colorless; 5=deep green.

EXAMPLE 2

Table 2 gives the destruction values in respect of the bacteria *Staphylococcus aureus* and *Escherichia coli* and the fungus *Aspergillus niger*.

Destruction values in respect of bacteria are determined as follows:

5 ml. of twice concentrated nutrient broth is added to each of a number of 5 ml. samples of increasing dilution of the active substance in sterile test tubes and mixed. One drop of a 1:10 diluted, sixteen hours old Staphylococcus or Escherichia broth culture is added to inoculate each test tube and incubation is carried out for twenty-four hours at 37° C. After this period, samples are taken from the test tubes and transferred to bacteria culture media which are also incubated for twenty-four hours at 37° C. The stage of dilution at which no development of bacteria takes place upon transfer to the culture medium is taken as the destruction value.

Testing the activity of the active substances against Aspergillus niger is carried out by adding the active substance to a nutrient solution most suitable for the growth of the fungus in different amounts graduated down to 1:1,000,000. Samples of 20 ml. each of the nutrient solution thus treated are inoculated with 0.1 mg. of spores of Aspergillus fungus in a 100 ml. Erlenmeyer flask. The flasks are kept for 120 hours at 36° C. and then the extent of the development of the fungus is judged. Table 2 shows the stages of dilution at which no growth of fungus takes place. For comparison, the results obtained with N-(3-chlorallyl)-hexaminium chloride (CHC) are given in the table.

TABLE 2

| Active substance | Bactericidal and fungicidal activity in various dilution ratios | | |
|---|---|---|---|
| | *Staphylococcus aureus* | *Escherichia coli* | *Aspergillus niger* |
| 1 | 1:100,000 | 1:2,000 | 1:5,000 |
| 2 | 1:100,000 | 1:8,600 | 1:5,000 |
| 3 | 1:8,000 | 1:2,000 | 1:10,000 |
| 4 | 1:80,000 | 1:10,000 | 1:10,000 |
| 5 | 1:200,000 | 1:10,000 | 1:20,000 |
| 6 | 1:40,000 | 1:20,000 | 1:100,000 |
| CHC (comparison) | 1:4,000 | 1:2,000 | 1:1,500 |

We claim:

1. A substituted benzylimidazole having the formula:

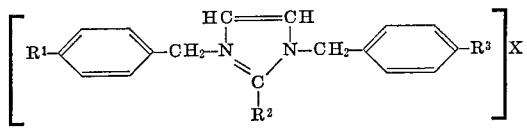

in which $R^1$ and $R^3$ are lower alkyl, [R] $R^2$ is a member selected from the group consisting of hydrogen and lower alkyl, and X is an acid radical derived from a halogen hydracid, sulfuric acid, p-toluene sulfonic acid, lower alkyl sulfonic acid, methylsulfuric acid or ethylsulfuric acid.

2. A substituted benzylimidazole as in claim 1 wherein X is an acid radical derived from a compound selected from the group consisting of hydrochloric acid, hydrobromic acid, hydriodic acid, p-toluene sulfonic acid, lower alkyl sulfonic acid, methylsulfuric acid and ethylsulfuric acid.

3. A substituted benzylimidazole as claimed in claim 1, wherein $R^1$ is propyl, $R^2$ is hydrogen, $R^3$ is isopropyl, and X is Cl.

4. A substituted benzylimidazole as claimed in claim 1, wherein $R^1$ is isopropyl, $R^2$ is methyl, $R^3$ is isopropyl, and X is Cl.

5. A substituted benzylimidazole as claimed in claim 1, wherein $R^1$ is isopropyl, $R^2$ is isopropyl, $R^3$ is isopropyl, and X is Cl.

6. A substituted benzylimidazole as claimed in claim 1, wherein $R^1$ is isopropyl, $R^2$ is hydrogen, $R^3$ is isobutyl, and X is Cl.

7. A substituted benzylimidazole as claimed in claim 1, wherein $R^1$ is isobutyl, $R^2$ is hydrogen, $R^3$ is isobutyl, and X is Cl.

8. A substituted benzylimidazole as claimed in claim 1, wherein $R^1$ is n-butyl, $R^2$ is hydrogen, $R^3$ is n-butyl, and X is Cl.

References Cited

Beilsteins Handbuch der Organischen Chemie 4th ed. vol. 23, p. 48, Berlin, Springer, 1936. QD 251.B4.

Schwarz et al. Jour. Amer. Chem. Soc. vol. 81, pp. 5693–4 relied on (1959). QDLA5.

HENRY R. JILES, Primary Examiner

NATALIE TROUSOF, Assistant Examiner

U.S. Cl. X.R.

424—273

PO-1050
(5/69)

UNITED STATES PATENT OFFICE
CERTIFICATE OF CORRECTION

Patent No. 3,493,581          Dated February 3, 1970

Inventor(s) Ernst Heinrich Pommer et al

It is certified that error appears in the above-identified patent and that said Letters Patent are hereby corrected as shown below:

Column 3, Table 2, entry no. 2, under "Escherichia coli", "1:8,600" should read "1:8,000".

Column 4, line 1, " [R] $R^2$ " should read --$R^2$--.

SIGNED AND
SEALED
JUN 23 1970

(SEAL)
Attest:

Edward M. Fletcher, Jr.
Attesting Officer

WILLIAM E. SCHUYLER, JR.
Commissioner of Patents